US011338502B2

(12) United States Patent
Shah et al.

(10) Patent No.: US 11,338,502 B2
(45) Date of Patent: May 24, 2022

(54) METHODS AND SYSTEMS FOR THREE-DIMENSIONAL PRINTING OF COMPOSITE OBJECTS

(71) Applicant: Arevo, Inc., Milpitas, CA (US)

(72) Inventors: Paren Shah, Santa Clara, CA (US); Hemant Bheda, Saratoga, CA (US)

(73) Assignee: Arevo, Inc., Milpitas, CA (US)

(*) Notice: Subject to any disclaimer, the term of this patent is extended or adjusted under 35 U.S.C. 154(b) by 379 days.

(21) Appl. No.: 16/688,320

(22) Filed: Nov. 19, 2019

(65) Prior Publication Data

US 2020/0156310 A1 May 21, 2020

Related U.S. Application Data

(63) Continuation of application No. PCT/US2018/033710, filed on May 21, 2018.

(60) Provisional application No. 62/509,684, filed on May 22, 2017.

(51) Int. Cl.
*B29C 64/118* (2017.01)
*B29C 64/264* (2017.01)
*B29C 64/245* (2017.01)
*B33Y 10/00* (2015.01)
*G02B 27/12* (2006.01)

(52) U.S. Cl.
CPC .......... *B29C 64/118* (2017.08); *B29C 64/245* (2017.08); *B29C 64/264* (2017.08); *B33Y 10/00* (2014.12); *G02B 27/126* (2013.01)

(58) Field of Classification Search
CPC .... B29C 64/118; B29C 64/264; G02B 27/126
See application file for complete search history.

(56) References Cited

U.S. PATENT DOCUMENTS

| 5,121,329 A | 6/1992 | Crump |
| 5,578,227 A | 11/1996 | Rabinovich |
| 6,004,124 A | 12/1999 | Swanson et al. |
| 6,054,077 A | 4/2000 | Comb et al. |

(Continued)

FOREIGN PATENT DOCUMENTS

| EP | 3045992 A1 | 7/2016 |
| EP | 3051445 A1 | 8/2016 |

(Continued)

OTHER PUBLICATIONS

Introduction to Polarization. https://www.edmundoptics.com/knowledge-center/application-notes/optics/introduction-to-polarization/ (retrieved online Jan. 25, 2022). (Year: 2022).*

(Continued)

*Primary Examiner* — Joseph S Del Sole
*Assistant Examiner* — Manley L Cummins, IV
(74) *Attorney, Agent, or Firm* — Jing Wang

(57) ABSTRACT

The present disclosure provides methods for generating a three-dimensional object, comprising directing at least one strand material from a source of at least one strand material towards a base. Next, at least a first light beam and a second light beam from a light source is used to subject at least one strand material to heating at one or more locations along at least one strand material. At least a portion of the three-dimensional object may be generated from at least one strand material upon subjecting at least one strand material to heating along one or more locations.

7 Claims, 6 Drawing Sheets

(56) References Cited

U.S. PATENT DOCUMENTS

| | | |
|---|---|---|
| 6,391,251 B1 | 5/2002 | Keicher et al. |
| 6,441,342 B1 | 8/2002 | Hsu |
| 7,024,272 B2 | 4/2006 | Thomas et al. |
| 7,483,818 B2 | 1/2009 | Amakai et al. |
| 7,896,209 B2 | 3/2011 | Batchelder et al. |
| 7,897,074 B2 | 3/2011 | Batchelder et al. |
| 8,308,876 B2 | 11/2012 | Woods et al. |
| 8,465,111 B2 | 6/2013 | Swanson et al. |
| 8,647,102 B2 | 2/2014 | Swanson et al. |
| 8,808,603 B2 | 8/2014 | Swanson |
| 8,920,697 B2 | 12/2014 | Mikulak et al. |
| 9,102,099 B1 | 8/2015 | Karpas et al. |
| 9,126,367 B1 | 9/2015 | Mark et al. |
| 9,156,205 B2 | 10/2015 | Mark et al. |
| 9,174,389 B2 | 11/2015 | Swanson |
| 9,254,535 B2 | 2/2016 | Buller et al. |
| 9,321,609 B2 | 4/2016 | Koop et al. |
| 9,327,452 B2 | 5/2016 | Mark et al. |
| 9,327,453 B2 | 5/2016 | Mark et al. |
| 9,339,972 B2 | 5/2016 | Gordon |
| 9,353,481 B2 | 5/2016 | Gupta et al. |
| 9,533,451 B2 | 1/2017 | Folgar et al. |
| 9,579,851 B2 | 2/2017 | Mark et al. |
| 9,579,891 B2 | 2/2017 | Hayashi et al. |
| 9,592,660 B2 | 3/2017 | Reese et al. |
| 9,595,037 B2 | 3/2017 | Glasgow et al. |
| 9,656,429 B1 | 5/2017 | Mantha et al. |
| 9,724,877 B2 | 8/2017 | Flitsch et al. |
| 9,738,030 B2 | 8/2017 | Lee et al. |
| 9,757,880 B2 | 9/2017 | Rothfuss et al. |
| 9,796,140 B2 | 10/2017 | Page et al. |
| 9,815,268 B2 | 11/2017 | Mark et al. |
| 10,052,813 B2 | 8/2018 | Armijo et al. |
| 2005/0098260 A1 | 5/2005 | Chen et al. |
| 2010/0312364 A1 | 12/2010 | Eryilmaz et al. |
| 2013/0101728 A1 | 4/2013 | Keremes et al. |
| 2013/0255346 A1 | 10/2013 | Danby et al. |
| 2013/0316081 A1 | 11/2013 | Kovalcik et al. |
| 2014/0232035 A1 | 8/2014 | Bheda |
| 2014/0265035 A1 | 9/2014 | Buser et al. |
| 2014/0268604 A1 | 9/2014 | Wicker et al. |
| 2014/0277669 A1 | 9/2014 | Nardi et al. |
| 2014/0291886 A1 | 10/2014 | Mark et al. |
| 2014/0328963 A1 | 11/2014 | Mark et al. |
| 2014/0361460 A1 | 12/2014 | Mark |
| 2014/0371895 A1 | 12/2014 | Sadusk et al. |
| 2015/0045928 A1 | 2/2015 | Perez et al. |
| 2015/0052025 A1 | 2/2015 | Apsley et al. |
| 2015/0097308 A1 | 4/2015 | Batchelder et al. |
| 2015/0246481 A1 | 9/2015 | Schlick et al. |
| 2015/0251356 A1 | 9/2015 | Batchelder et al. |
| 2015/0273583 A1 | 10/2015 | Bumgardner |
| 2015/0298393 A1 | 10/2015 | Suarez |
| 2015/0314532 A1 | 11/2015 | Gordon et al. |
| 2015/0321255 A1 | 11/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336292 A1 | 11/2015 | Mikulak et al. |
| 2015/0360288 A1 | 12/2015 | Zalewski et al. |
| 2016/0031159 A1 | 2/2016 | Church et al. |
| 2016/0038655 A1 | 2/2016 | Weisman et al. |
| 2016/0046081 A1 | 2/2016 | Kim et al. |
| 2016/0067820 A1 | 3/2016 | Mironets et al. |
| 2016/0075091 A1 | 3/2016 | Cable |
| 2016/0082641 A1 | 3/2016 | Bogucki et al. |
| 2016/0114532 A1* | 4/2016 | Schirtzinger ......... B29C 64/147 428/411.1 |
| 2016/0129643 A1 | 5/2016 | Mark et al. |
| 2016/0136885 A1 | 5/2016 | Nielsen-Cole et al. |
| 2016/0136887 A1 | 5/2016 | Guillemette et al. |
| 2016/0144564 A1 | 5/2016 | Padgett et al. |
| 2016/0144565 A1 | 5/2016 | Mark et al. |
| 2016/0144566 A1 | 5/2016 | Mark et al. |
| 2016/0151833 A1 | 6/2016 | Tsao |
| 2016/0159012 A1 | 6/2016 | Lee et al. |
| 2016/0184925 A1 | 6/2016 | Huang et al. |
| 2016/0185028 A1 | 6/2016 | Bogue et al. |
| 2016/0202691 A1* | 7/2016 | Pettersson ........ G05B 19/41865 700/98 |
| 2016/0236279 A1 | 8/2016 | Ashton et al. |
| 2016/0236414 A1 | 8/2016 | Reese et al. |
| 2016/0236416 A1 | 8/2016 | Bheda et al. |
| 2016/0236419 A1 | 8/2016 | Griffin et al. |
| 2016/0243649 A1 | 8/2016 | Zheng et al. |
| 2016/0257068 A1 | 9/2016 | Albert et al. |
| 2016/0266573 A1 | 9/2016 | Bheda et al. |
| 2016/0271880 A1 | 9/2016 | Bheda et al. |
| 2016/0288264 A1 | 10/2016 | Jones et al. |
| 2016/0297142 A1 | 10/2016 | Bheda et al. |
| 2016/0297935 A1 | 10/2016 | Reese et al. |
| 2016/0303805 A1 | 10/2016 | Chen et al. |
| 2016/0311165 A1 | 10/2016 | Mark et al. |
| 2016/0325491 A1 | 11/2016 | Sweeney et al. |
| 2016/0332366 A1 | 11/2016 | Donovan |
| 2016/0332369 A1* | 11/2016 | Shah ..................... B33Y 30/00 |
| 2016/0332380 A1 | 11/2016 | De et al. |
| 2016/0346998 A1 | 12/2016 | Mark et al. |
| 2016/0361869 A1 | 12/2016 | Mark et al. |
| 2016/0368213 A1 | 12/2016 | Mark |
| 2017/0021455 A1 | 1/2017 | Dallarosa et al. |
| 2017/0021565 A1 | 1/2017 | Deaville |
| 2017/0036403 A1 | 2/2017 | Ruff et al. |
| 2017/0057160 A1 | 3/2017 | Duty et al. |
| 2017/0057167 A1 | 3/2017 | Van et al. |
| 2017/0072633 A1* | 3/2017 | Hsu ...................... B29C 64/106 |
| 2017/0080642 A1 | 3/2017 | Tyler |
| 2017/0096576 A1 | 4/2017 | Bheda et al. |
| 2017/0120519 A1 | 5/2017 | Mark et al. |
| 2017/0144375 A1 | 5/2017 | Waldrop, III et al. |
| 2017/0145155 A1 | 5/2017 | Wright et al. |
| 2017/0146489 A1 | 5/2017 | Redding et al. |
| 2017/0151704 A1 | 6/2017 | Go et al. |
| 2017/0151728 A1 | 6/2017 | Kunc et al. |
| 2017/0151731 A1 | 6/2017 | Ho et al. |
| 2017/0157843 A1 | 6/2017 | Nystrom et al. |
| 2017/0157845 A1* | 6/2017 | Bihari .................. B29C 64/393 |
| 2017/0165908 A1* | 6/2017 | Pattinson ............... B33Y 10/00 |
| 2017/0173868 A1 | 6/2017 | Mark |
| 2017/0173883 A1 | 6/2017 | Gray et al. |
| 2017/0182718 A1* | 6/2017 | Hsiao ..................... C22C 47/12 |
| 2017/0197371 A1 | 7/2017 | Fetfatsidis et al. |
| 2017/0210074 A1 | 7/2017 | Ueda et al. |
| 2017/0247553 A1 | 8/2017 | Ganapathiappan et al. |
| 2017/0266885 A1 | 9/2017 | Gifford et al. |
| 2017/0274585 A1 | 9/2017 | Armijo et al. |
| 2017/0304894 A1 | 10/2017 | Buller |
| 2017/0326802 A1 | 11/2017 | Mark et al. |
| 2017/0368748 A1 | 12/2017 | De et al. |
| 2018/0001550 A1 | 1/2018 | Zhao et al. |
| 2018/0079135 A1* | 3/2018 | Duis .................... B29C 64/106 |
| 2018/0117836 A1 | 5/2018 | Reese et al. |
| 2018/0117837 A1 | 5/2018 | Reese et al. |
| 2018/0117838 A1 | 5/2018 | Reese et al. |
| 2018/0117851 A1* | 5/2018 | Reese .................. B29C 64/118 |
| 2018/0200955 A1* | 7/2018 | Hoelldorfer .......... B29C 64/336 |
| 2018/0237329 A1 | 8/2018 | Drewnowski et al. |
| 2018/0243978 A1 | 8/2018 | Nguyen et al. |
| 2018/0272460 A1 | 9/2018 | Nelson et al. |
| 2018/0319098 A1 | 11/2018 | Armijo et al. |
| 2018/0354182 A1* | 12/2018 | Miyake ................. B29C 48/885 |
| 2019/0009461 A1 | 1/2019 | Armijo et al. |
| 2019/0134750 A1 | 5/2019 | Nau et al. |
| 2020/0156310 A1* | 5/2020 | Shah .................... B29C 64/118 |

FOREIGN PATENT DOCUMENTS

| | | |
|---|---|---|
| EP | 3148711 A1 | 4/2017 |
| EP | 3150361 A1 | 4/2017 |
| GB | 2453945 A | 4/2009 |
| KR | 100847550 B1 | 7/2008 |
| KR | 20130060144 A | 6/2013 |
| KR | 101451794 B1 | 10/2014 |
| WO | WO-2014193505 A1 | 12/2014 |

(56) References Cited

FOREIGN PATENT DOCUMENTS

| WO | WO-2015009938 A1 | 1/2015 |
|----|------------------|--------|
| WO | WO-2015042422 A1 | 3/2015 |
| WO | WO-2015119819 A2 | 8/2015 |
| WO | WO-2015130401 A2 | 9/2015 |
| WO | WO-2015163776 A1 | 10/2015 |
| WO | WO-2015164954 A1 | 11/2015 |
| WO | WO-2015193819 A2 | 12/2015 |
| WO | WO-2016142472 A1 | 9/2016 |
| WO | WO-2016187106 A1 | 11/2016 |
| WO | WO-2017008789 A1 | 1/2017 |
| WO | WO-2017100783 A1 | 6/2017 |
| WO | WO-2017123726 A1 | 7/2017 |
| WO | WO-2017149896 A1 | 9/2017 |
| WO | WO-2017210490 A1 | 12/2017 |
| WO | WO-2018182773 | 10/2018 |
| WO | WO-2018204574 | 11/2018 |
| WO | WO-2018217650 A1 | 11/2018 |
| WO | WO-2019050509 | 3/2019 |

OTHER PUBLICATIONS

Clausen, et al. Exploiting Additive Manufacturing Infill in Topology Optimization for Improved Buckling Load. Engineering 2.2 (2016): 250-257.
Co-pending U.S. Appl. No. 16/672,025, filed Nov. 1, 2019.
EP17807520.6 The Extended European Search Report dated Dec. 6, 2019.
International search report and written opinion dated Aug. 17, 2017 for PCT Application No. PCT/US2017/035551.
International search report and written opinion dated Nov. 22, 2017 for PCT Application No. PCT/US2017/045986.
Notice of allowance dated Jan. 4, 2017 for U.S. Appl. No. 15/232,767.
Notice of allowance dated Apr. 27, 2017 for U.S. Appl. No. 15/232,767.
Notice of allowance dated Nov. 30, 2017 for U.S. Appl. No. 14/623,471.
Office action dated Mar. 30, 2017 for U.S. Appl. No. 14/623,471.
Office action dated Aug. 30, 2017 for U.S. Appl. No. 14/623,471.
Office action dated Sep. 14, 2017 for U.S. Appl. No. 14/621,205.
Office action dated Nov. 14, 2016 for U.S. Appl. No. 15/232,767.
PCT/US2017/050153 International Search Report and Written Opinion dated May 24, 2018.
PCT/US2017/050155 International Search Report and Written Opinion dated Dec. 7, 2017.
PCT/US2018/030785 International Search Report and Written Opinion dated Sep. 28, 2018.
PCT/US2018/033710 International Search Report and Written Opinion dated Oct. 31, 2018.
U.S. Appl. No. 15/471,786 Notice of Allowance dated Feb. 7, 2018.
U.S. Appl. No. 15/471,786 Notice of Allowance dated Jun. 27, 2018.
U.S. Appl. No. 15/471,786 Office Action dated Aug. 23, 2017.
U.S. Appl. No. 15/845,629 Office Action dated Apr. 13, 2018.
U.S. Appl. No. 15/845,629 Office Action dated Apr. 19, 2019.
U.S. Appl. No. 15/845,629 Office Action dated Nov. 1, 2019.
U.S. Appl. No. 15/845,629 Office Action dated Oct. 19, 2018.
U.S. Appl. No. 15/845,673 Office Action dated Apr. 11, 2018.
U.S. Appl. No. 15/845,673 Office Action dated Apr. 19, 2019.
U.S. Appl. No. 15/845,673 Office Action dated Dec. 27, 2019.
U.S. Appl. No. 15/845,673 Office Action dated Oct. 19, 2018.
U.S. Appl. No. 15/845,762 Office Action dated Apr. 6, 2018.
U.S. Appl. No. 15/845,762 Office Action dated May 3, 2019.
U.S. Appl. No. 15/845,762 Office Action dated Nov. 1, 2019.
U.S. Appl. No. 15/845,762 Office Action dated Oct. 19, 2018.
U.S. Appl. No. 15/845,843 Office Action dated Apr. 3, 2018.
U.S. Appl. No. 15/845,843 Office Action dated Dec. 27, 2019.
U.S. Appl. No. 15/845,843 Office Action dated Mar. 8, 2019.
U.S. Appl. No. 15/845,843 Office Action dated Oct. 19, 2018.
U.S. Appl. No. 15/587,292 Office Action dated Aug. 2, 2019.
U.S. Appl. No. 15/587,292 Office Action dated Feb. 6, 2019.
U.S. Appl. No. 16/033,041 Office Action dated Sep. 13, 2019.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
Zhang, et al. Study on Metamorphic Rolling Mechanism for Metal Hybrid Additive Manufacturing. The 24th international SFF symposium—an additive manufacturing conference. Aug. 2013.

* cited by examiner

METHODS AND SYSTEMS FOR THREE-DIMENSIONAL PRINTING OF COMPOSITE OBJECTS

CROSS-REFERENCE

The present application is a continuation of International Patent Application No. PCT/US18/33710, filed May 21, 2018, which claims the benefit of U.S. Provisional Patent Application No. 62/509,684, filed May 22, 2017, each of which is entirely incorporated herein by reference.

BACKGROUND

Additive manufacturing has been utilized for printing three-dimensional parts by depositing successive layers of material in an automated manner. Techniques of additive manufacturing include, without limitation, fused deposition modeling (FDM), fused filament fabrication (FFF), Plastic Jet Printing (PJP), extrusion-based techniques, jetting, selective laser sintering, powder/binder jetting, electron-beam melting, and stereolithographic processes. Using these techniques, a material (e.g., a heated and/or pressurized thermoplastic) may pass through a print head. The print head may be moved in a predefined trajectory (e.g., a tool path) as the material discharges from the print head, such that the material is laid down in a particular pattern and shape of overlapping layers. The material, after exiting the print head, may harden into a final form.

SUMMARY

In an aspect, the present disclosure provides a method for generating a three-dimensional object, comprising (a) directing at least one strand material from a source of said at least one strand material towards a base; (b) using at least a first light beam and a second light beam from a light source to subject said at least one strand material to heating at one or more locations along said at least one strand material; and (c) generating at least a portion of said three-dimensional object from said at least one strand material upon subjecting said at least one strand material to heating along said one or more locations.

In some embodiments, (a) comprises (i) directing said at least one strand material from said source to an opening, and (ii) directing said at least one strand material from said opening towards said base. In some embodiments, the at least one strand material is a composite material. In some embodiments, the at least one strand material is a continuous fiber composite. In some embodiments, the at least one strand material has a diameter from about 0.1 millimeters to 5 millimeters. In some embodiments, the light source is a laser. In some embodiments, the light source is in optical communication with one or more beam splitters.

In some embodiments, the one or more beam splitters splits a light beam from said light source into one or more beamlets that yield said at least said first light beam and said second light beam. In some embodiments, the method for generating a three-dimensional object further comprises one or more optical wedges in optical communication with said one or more beam splitters. In some embodiments, the one or more optical wedges form said at least said first light beam and said second light beam. In some embodiments, the one or more optical wedges form said at least said first light beam and said second light beam in a uniform orientation. In some embodiments, the one or more beamlets passes through one or more focusing lenses prior to passing through said at least one or more optical wedges. In some embodiments, the one or more beamlets have an elliptical polarization. In some embodiments, the one or more beamlets comprises a minor axis of at least about 1 millimeter and a major axis of at least about 15 millimeters. In some embodiments, the one or more focusing lenses adjust a ratio of a minor axis to a major axis of said one or more beamlets. In some embodiments, the one or more optical wedges directs an optical path of said at least said first light beam and said second light beam of a given location, direction, or angle normal to said base and/or along said base among one or more locations, directions, or angles. In some embodiments, the one or more optical wedges is a Risley prism pair. In some embodiments, the one or more optical wedges comprise a first optical wedge and a second optical wedge. In some embodiments, the one or more optical wedges have a diameter from about 0.1 inches to 1 inch. In some embodiments, the first optical wedge rotates relative to said second optical wedge to change the direction of said at least said first light beam and said second light beam. In some embodiments, the first optical wedge and said second optical wedge are angled in the same direction to produce a greater angle of said at least said first light beam and said second light beam. In some embodiments, the first optical wedge and said second optical wedge rotates in an opposite direction to allow said at least said first light beam and said second light beam to pass vertically through said one or more optical wedges. In some embodiments, (i) altering an angle of incidence of said first optical wedge and said second optical wedge, or (ii) altering a direction of said major axis of said at least said first light beam and said second light beam relative to said base or said at least one strand material, alters a fluence of said at least said first light beam and said second light beam.

In some embodiments, wherein said at least said first light beam and said second light beam is incident on said at least one strand material and on said base. In some embodiments, the at least said first light beam and said second light beam covers at least a portion of said at least one strand material. In some embodiments, the at least said first light beam and said second light beam is directed along a dispensing route of said at least one strand material. In some embodiments, the at least said first light beam and said second light beam is directed along a given angle among one or more angles relative to the dispensing route of said at least one strand material. In some embodiments, (b) comprises directing said at least one strand material to one or more compaction units while heating said at least one strand material with said at least said first light beam and said second light beam along one or more points of said at least one strand material. In some embodiments, the method for generating a three-dimensional object further comprises compacting said at least one strand material by said one or more compaction units in a compaction module to form at least one compacted strand material while heating said at least one compacted strand material with said at least said first light beam and said second light beam along one or more points of said at least one compacted strand material. In some embodiments, the compaction module comprises a rigid body, one or more idler rollers, at least one freely suspended roller, and a cooling unit. In some embodiments, one or more idler rollers or said at least one freely suspended roller has a diameter from about 1 millimeter to 10 millimeter. In some embodiments, (b) comprises using one or more sensors to measure one or more temperature(s) along said at least one strand material during deposition. In some embodiments, one or more sensors control intensities of said at least said first light beam and said second light beam. In some embodiments, one or more sensors is an optical pyrometer. In some embodiments, a real time simulation provides feedback control of a given location, direction, or angle of said at least said first light beam and said second light beam normal to said base and/or along said base among one or more locations, directions, or angles. In some embodiments, the at least said first light beam and said second light beam heats said at least one strand material without melting said at least one strand material. In some embodiments, the at least said first light beam and said second light beam heats and melts said at least one strand material at a given location among said one or more locations. In some embodiments, the at least said first light beam and said second light beam cuts said at least one strand material at a given location among said one or more locations.

In another aspect, the present disclosure provides a system for generating a three-dimensional object, comprising a source of at least one strand material that is configured to supply at least one strand material for generating said three-dimensional object; a light source configured to supply at least a first light beam and a second light beam; a base adjacent to which said three-dimensional object is formed; and a controller operatively coupled to said light source, wherein said controller is programmed to (i) direct said at least one strand material from said source of said at least one strand material towards said base, (ii) use at least said first light beam and said second light beam from said light source to subject said at least one strand material to heating at one or more locations along said at least one strand material, and (iii) generate at least a portion of said three-dimensional object from said at least one strand material upon subjecting said at least one strand material to heating along said one or more locations.

In some embodiments, the system for generating a three-dimensional object further comprises an opening for (i) receiving said at least one strand material, and (ii) directing said at least one strand material towards said base. In some embodiments, the system for generating a three-dimensional object further comprises one or more compaction units in a compaction module for compressing said at least one strand material along said base. In some embodiments, the compaction module comprises a rigid body, one or more idler rollers, at least one freely suspended roller, and a cooling unit. In some embodiments, the one or more idler rollers or said at least one freely suspended roller has a diameter from about 1 millimeter to 10 millimeter. In some embodiments, the system for generating a three-dimensional object further comprises one or more sensors to measure one or more temperature(s) along said at least one strand material during deposition. In some embodiments, the one or more sensors is an optical pyrometer. In some embodiments, the base comprises a drive mechanism for moving said base. In some embodiments, the at least one strand material is a composite material. In some embodiments, the at least one strand material is a continuous fiber composite. In some embodiments, the at least one strand material has a diameter from about 0.1 millimeters to 5 millimeters. In some embodiments, the light source is a laser.

In some embodiments, the system for generating a three-dimensional object further comprises an optical system in which light source is in optical communication with one or more beam splitters, which one or more beam splitters splits a light beam from said light source into one or more beamlets that yield said at least said first light beam and said second light beam. In some embodiments, the optical system comprises one or more elements selected from the group consisting of one or more beam splitters, one or more focusing lenses, one or more optical wedges, and any combination thereof. In some embodiments, the one or more optical wedges is a Risley prism pair. In some embodiments, the one or more optical wedges comprise a first optical wedge and a second optical wedge. In some embodiments, the one or more optical wedges has a diameter from about 0.1 inches to 1 inch.

In some embodiments, the system for generating a three-dimensional object further comprises a real time simulation program. In some embodiments, the real time simulation program is a feedback control system.

In another aspect, the present disclosure provides a method for generating a three-dimensional object, comprising (a) directing at least one strand material from a source of the at least one strand material towards a base; (b) using at least a first light beam and a second light beam from a light source to subject the at least one strand material to heating at one or more locations along the at least one strand material; and (c) generating at least a portion of the three-dimensional object from the at least one strand material upon subjecting the at least one strand material to heating along one or more locations. In some embodiments, (a) comprises (i) directing the at least one strand material from the source to an opening, and (ii) directing the at least one strand material from the opening towards the base. In some embodiments, the at least one strand material is a composite material. In some embodiments, the at least one strand material is a continuous fiber composite. In some embodiments, the continuous fiber composite is selected from the group consisting of glass, carbon, aramid, cotton, silicon carbide, polymer, wool, metal, and any combination thereof. In some embodiments, the at least one strand material has a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. In some embodiments, the at least one strand material has a diameter from about 0.1 millimeters to 5 millimeters.

In some embodiments, the light source is a laser. In some embodiments, the light source is in optical communication with one or more beam splitters, which one or more beam splitters splits a light beam from the light source into one or more beamlets that yield at least the first light beam and the second light beam. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. In some embodiments, the method for generating a three-dimensional object further comprises one or more optical wedges in optical communication with the one or more beam splitters, which one or more optical wedges form the at least the first light beam and the second light beam. In some embodiments, the one or more optical wedges form at least the first light beam and the second light beam in a uniform orientation. In some embodiments, one or more beamlets passes through one or more focusing lenses prior to passing through the at least one or more optical wedges. In some embodiments, one or more beamlets have an elliptical polarization. In some embodiments, one or more beamlets comprises a minor axis of at least about 1 millimeter and a major axis of at least about 15 millimeters. In some embodiments, the one or more focusing lenses adjust a ratio of a minor axis to a major axis of the one or more beamlets. In some embodiments, the one or more optical wedges directs an optical path of at least the first light beam and the second light beam of a given location, direction, or angle normal to the base and/or along the base among one or more locations, directions, or angles.

In some embodiments, the one or more optical wedges is a Risley prism pair. In some embodiments, the one or more optical wedges has a refractive index of at least about 1. In some embodiments, the one or more optical wedges comprise a first optical wedge and a second optical wedge. In some embodiments, the one or more optical wedges has a diameter from about 0.1 inches to 1 inch. In some embodiments, the first optical wedge rotates relative to the second optical wedge to change the direction of the at least the first light beam and the second light beam. In some embodiments, the first optical wedge and the second optical wedge are angled in the same direction to produce a greater angle of the at least first light beam and the second light beam. In some embodiments, the first optical wedge and the second optical wedge rotates in an opposite direction to allow the at least the first light beam and the second light beam to pass vertically through the one or more optical wedges. In some embodiments, (i) altering an angle of incidence of the first optical wedge and the second optical wedge, or (ii) altering a direction of the major axis of the at least the first light beam and the second light beam relative to the base or at least one strand material, alters a fluence of the at least the first light beam and the second light beam.

In some embodiments, the at least the first light beam and the second light beam is incident on the at least one strand material and on the base. In some embodiments, the at least the first light beam and the second light beam covers at least a portion of the at least one strand material. In some embodiments, the at least the first light beam and the second light beam is directed along a dispensing route of the at least one strand material. In some embodiments, the at least the first light beam and the second light beam is directed along a given angle among one or more angles relative to the dispensing route of the at least one strand material. In some embodiments, (b) comprises directing the at least one strand material to one or more compaction units while heating the at least one strand material with the at least the first light beam and the second light beam along one or more points of the at least one strand material. In some embodiments, (b) further comprises compacting the at least one strand material by the one or more compaction units in a compaction module to form at least one compacted strand material while heating the at least one compacted strand material with the at least the first light beam and the second light beam along one or more points of the at least one compacted strand material. In some embodiments, the compaction module comprises a rigid body, one or more idler rollers, at least one freely suspended roller, and a cooling unit. In some embodiments, the one or more idler rollers or at least one freely suspended roller has a diameter from about 1 millimeter to 10 millimeter. In some embodiments, (b) comprises using one or more sensors to measure one or more temperature(s) along the at least one strand material during deposition. In some embodiments, the one or more sensors control intensities of at least the first light beam and the second light beam. In some embodiments, the one or more sensors is an optical pyrometer. In some embodiments, a real time simulation provides feedback control of a given location, direction, or angle of the at least the first light beam and the second light beam normal to the base and/or along the base among one or more locations, directions, or angles. In some embodiments, at least the first light beam and the second light beam heats the at least one strand material without melting the at least one strand material. In some embodiments, at least the first light beam and the second light beam heats and melts the at least one strand material at a given location among the one or more locations. In some embodiments, at least the first light beam and the second light beam cuts the at least one strand material at a given location among the one or more locations.

In another aspect, the present disclosure provides a system for generating a three-dimensional object, comprising a source of at least one strand material that is configured to supply at least one strand material for generating said three-dimensional object; a light source configured to supply at least a first light beam and a second light beam; a base adjacent to which the three-dimensional object is formed; and a controller operatively coupled to the light source, wherein the controller is programmed to (i) direct the at least one strand material from the source of the at least one strand material towards the base, (ii) use at least the first light beam and the second light beam from the light source to subject the at least one strand material to heating at one or more locations along the at least one strand material, and (iii) generate at least a portion of the three-dimensional object from the at least one strand material upon subjecting the at least one strand material to heating along the one or more locations.

In some embodiments, the system for generating a three-dimensional object further comprises an opening for (i) receiving the at least one strand material, and (ii) directing the at least one strand material towards the base. In some embodiments, the system for generating a three-dimensional object further comprising one or more compaction units in a compaction module for compressing said at least one strand material along said base. In some embodiments, the compaction module comprises a rigid body, one or more idler rollers, at least one freely suspended roller, and a cooling unit. In some embodiments, the one or more idler rollers or at least one freely suspended roller has a diameter from about 1 millimeter to 10 millimeter. In some embodiments, the system for generating a three-dimensional object further comprises one or more sensors to measure one or more temperature(s) along the at least one strand material during deposition. In some embodiments, the one or more sensors are an optical pyrometer. In some embodiments, the base comprises a drive mechanism for moving the base. In some embodiments, the at least one strand material is a composite material. In some embodiments, the at least one strand material is a continuous fiber composite. In some embodiments, the continuous fiber composite is selected from the group consisting of glass, carbon, aramid, cotton, silicon carbide, polymer, wool, metal, and any combination thereof. In some embodiments, the at least one strand material has a diameter from about 0.1 millimeters to 5 millimeters. In some embodiments, the light source is a laser. In some embodiments, the system for generating a three-dimensional object further comprises an optical system in which light source is in optical communication with one or more beam splitters, which one or more beam splitters splits a light beam from the light source into one or more beamlets that yield the at least the first light beam and the second light beam.

In some embodiments, the optical system comprises one or more elements selected from the group consisting of one or more beam splitters, one or more focusing lenses, one or more optical wedges, and any combination thereof. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. In some embodiments, the one or more optical wedges is a Risley prism pair. In some embodiments, the one or more optical wedges have a refractive index of at least about 1. In some embodiments, the one or more optical wedges comprise a first optical wedge and a second optical wedge. In some embodiments, the one or more optical wedges has a diameter from about 0.1 inches to 1 inch. In some embodiments, the system for generating a three-dimensional object further comprises a real time simulation program. In some embodiments, the real time simulation program is a feedback control system.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1A:
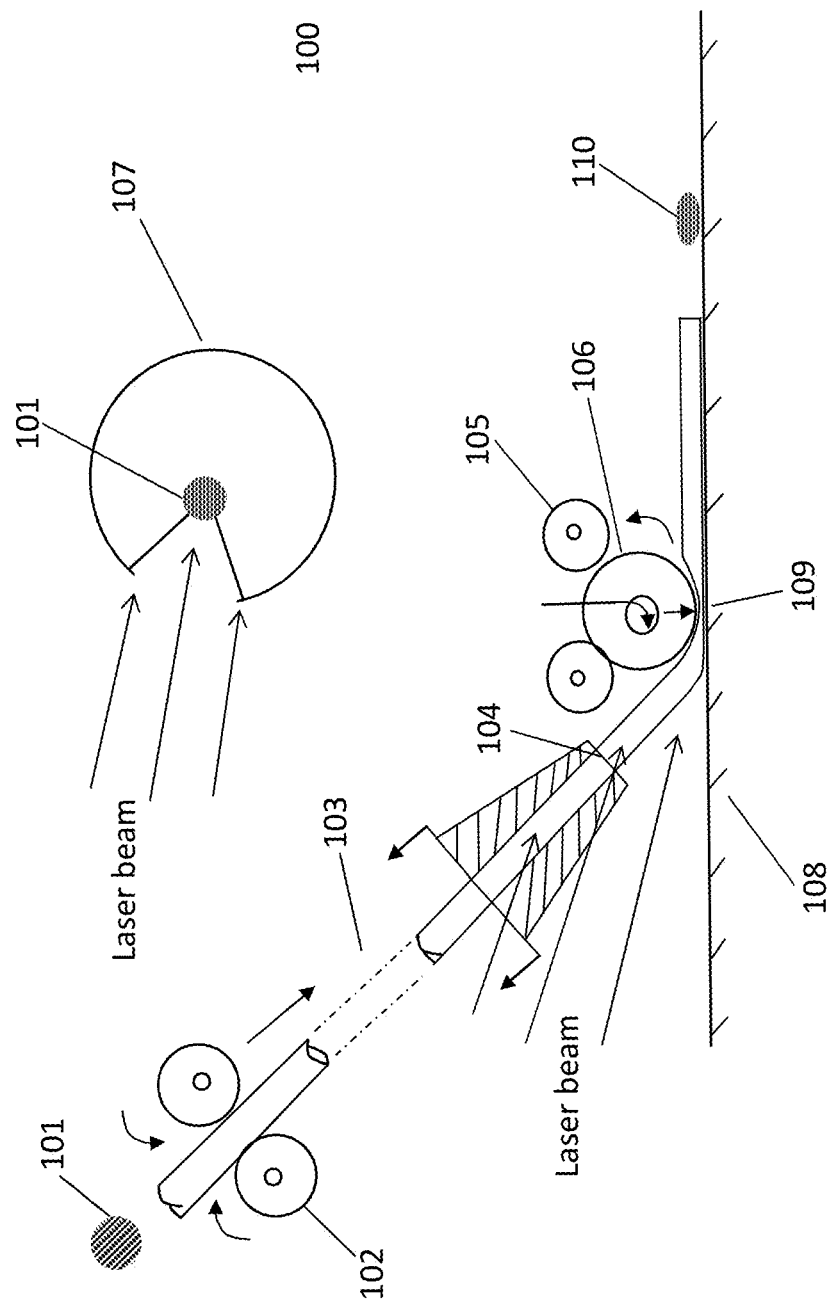
FIG. 1A illustrates an example system 100, which may be used to produce a three-dimensional object.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional printing" (also "3D printing"), as used herein, generally refers to a process or method for generating a 3D part (or object). For example, 3D printing may refer to sequential addition of material layer or joining of material layers or parts of material layers to form a three-dimensional (3D) part or structure, in a controlled manner (e.g., under automated control). In the 3D printing process, the deposited material can be fused, sintered, melted, bound or otherwise connected to form at least a part of the 3D object. Fusing the material may include melting or sintering the material. Binding can comprise chemical bonding. Chemical bonding can comprise covalent bonding. Examples of 3D printing include additive printing (e.g., layer by layer printing, or additive manufacturing). The 3D printing may further comprise subtractive printing.

The term "part," as used herein, generally refers to an object. A part may be generated using 3D printing methods and systems of the present disclosure. A part may be a portion of a larger part or object, or an entirety of an object. A part may have various form factors, as may be based on a model of such part. Such form factors may be predetermined.

The term "composite material," as used herein, generally refers to a material made from two or more constituent materials with different physical or chemical properties that, when combined, produce a material with characteristics different from the individual components.

The term "fuse", as used herein, generally refers to binding, agglomerating, or polymerizing. Fusing may include melting, softening or sintering. Binding may comprise chemical binding. Chemical binding may include covalent binding. The energy source resulting in fusion may supply energy by a laser, a microwave source, source for resistive heating, an infrared energy (IR) source, a ultraviolet (UV) energy source, hot fluid (e.g., hot air), a chemical reaction, a plasma source, a microwave source, an electromagnetic source, or an electron beam. Resistive heating may be joule heating. A source for resistive heating may be a power supply. The hot fluid can have a temperature greater than 25° C., or greater than or equal to about 40° C., 50° C., 60° C., 70° C., 80° C., 90° C., 100° C., 150° C., 200° C., 250° C., 300° C., 350° C., 400° C., 450° C., 500° C., or higher. The hot fluid may have a temperature that is selected to soften or melt a material used to print an object. The hot fluid may have a temperature that is at or above a melting point or glass transition point of a polymeric material. The hot fluid can be a gas or a liquid. In some examples, the hot fluid is air.

The term "adjacent" or "adjacent to," as used herein, generally refers to 'on,' 'over, 'next to,' 'adjoining,' 'in contact with,' or 'in proximity to.' In some instances, adjacent components are separated from one another by one or more intervening layers. The one or more intervening layers may have a thickness less than about 10 micrometers ("microns"), 1 micron, 500 nanometers ("nm"), 100 nm, 50 nm, 10 nm, 1 nm, 0.5 nm or less. For example, a first layer adjacent to a second layer can be on or in direct contact with the second layer. As another example, a first layer adjacent to a second layer can be separated from the second layer by at least a third layer.

Examples of 3D printing methodologies comprise extrusion, wire, granular, laminated, light polymerization, or power bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Power bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP) or laminated object manufacturing (LOM).

Three-dimensional printing may be performed using various materials. In some examples, a material that may be used in 3D printing includes a polymeric material, elemental metal, metal alloy, a ceramic, composite material, an allotrope of elemental carbon, or a combination thereof. The allotrope of elemental carbon may comprise amorphous carbon, graphite, graphene, diamond, or fullerene. The fullerene may be selected from the group consisting of a spherical, elliptical, linear, tubular fullerene, and any combination thereof. The fullerene may comprise a buckyball or a carbon nanotube. The material may comprise an organic material, for example, a polymer or a resin. The material may comprise a solid or a liquid. The material may include one or more strands or filaments. The solid material may comprise powder material. The powder material may be coated by a coating (e.g., organic coating such as the organic material (e.g., plastic coating)). The powder material may comprise sand. The material may be in the form of a powder, wire, pellet, or bead. The material may have one or more layers. The material may comprise at least two materials. In some cases, the material includes a reinforcing material (e.g., that forms a fiber). The reinforcing material may comprise a carbon fiber, Kevlar®, Twaron®, ultra-high-molecular-weight polyethylene, or glass fiber.

The filament material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, polyamide, polyimide, polyphenylene sulfide, polyphenylsulfone, polysulfone, polyether sulfone, polyethylenimine, polytetrafluoroethylene, polyvinylidene, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the filament material may comprise metal particles infused into a binder matrix. The metal particles may be metal powder. The binder matrix may include resins or polymers. Additionally, such binder matrix can be used a delivery device for the metal particles. Once the filament material is deposited onto the base, one or more energy sources can heat and melt the binder matrix, leaving the metal particles to melt and fuse into larger metal particles. Such energy sources may be without limitation, by a laser, a microwave source, a resistive heating source, an infrared energy source, a UV energy source, a hot fluid, a chemical reaction, a plasma source, a microwave source, an electromagnetic source, or an electron beam. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

Prior to printing the part, a computer aided design (CAD) model can be optimized based on specified requirements. For example, the CAD model may comprise a geometry "envelop". A geometry envelop may be an initial shell design of the three-dimensional part comprising design requirements and geometric features. The geometry of the CAD model may be received by way of I/O devices. Design requirements can be selected from the group consisting of strength, structural deflections, stress, strain, tension, shear, load capacity, stiffness, factor-of safety, weight, strength to weight ratio, envelop geometry, minimal print time, thermal performance, electrical performance, porosity, infill, number of shells, layer height, extruder temperature, solid density, melt density, printing speed, print head movement speed, and any combination thereof.

The CAD model may be initially partitioned according to user input and built in tool path generator rules to produce numerical control programming codes of the partitioned computer model. Partitioning can generate one or more parameters for printing the part. The One or more parameters may be selected from the group consisting of filament diameter, layer thickness, infill percentage, infill pattern, raster angle, build orientation, extrudate width, layer height, shell number, infill overlap, grid spacing, and any combination thereof. Partitioning can also generate one or more numerical control programming code of the partitioned computer model. The numerical control programming code can comprise G-code files and intermediate files. G-code files may be a numerical control programming language and can be used in computer-aided manufacturing as a way of controlling automated machine tools. The actions controlled by the G-code may comprise rapid movement, controlled feed in an arc or straight line, series of controlled feed movements, switch coordinate systems, and a set of tool information. Intermediate files may comprise supplemental files and tools for a primary build output. Additionally, intermediate files can comprise automatically generated source files or build output from helper tools. The information from the G-code files and the intermediate files may be extracted to determine the geometry of the three-dimensional printed part.

Prior to printing the three-dimensional object, a model, in computer memory, of the part for three-dimensional printing may be received from a material. The material can comprise a matrix and fiber material. Additionally, in computer memory, one or more properties for the material may be received. Using the model, a print head tool path may be determined for use during the three-dimensional printing of the part. A virtual mesh of analytic elements may be generated within the model of the part and a trajectory of at least one stiffness-contributing portion of the material may be determined based at least in part on the print head tool path, wherein the trajectory of the at least one stiffness-contributing portion is determined through each of the analytic elements in the virtual mesh. Next, one or more computer processors may be used to determine a performance of the part based at least in part on the one or more properties received and the trajectory of the at least one stiffness-contributing portion. The performance of the part may be electronically outputted. The three-dimensional object may then be printed along the print head tool path.

In an aspect, the present disclosure provides a method for generating a three-dimensional object. At least one strand material may be directed from a source of at least one strand material towards a base. Such a strand material may be directed from the source to an opening and may also be directed from the opening towards the base. At least a first light beam and a second light beam from at least one light source may be used to subject at least one strand material to heating at one or more locations along at least one strand material. Next, at least a portion of the three-dimensional object may be generated from at least one strand material upon subjecting at least one strand material to heating along one or more locations.

FIG. 1A illustrates an example system 100, which may be used to produce a three-dimensional object having any desired shape, size, and structure. System 100 may include an extender mechanism 102 comprising one or more rollers for directing at least one strand material 103 from a source of at least one strand material towards a base 108. Such strand material may initially comprise an uncompressed cross section 101. The extender mechanism can include an extruder motor for dispensing at least one strand material. This strand material may be directed from the source to an opening, such as a nozzle 104, and can also be directed from the opening towards the base. The opening may receive at least one strand material, and can direct such strand material towards the base. The base may be adjacent to which the three-dimensional object is formed. Additionally, the base can include a drive mechanism for moving the base.

At least a first light beam and a second light beam from at least one light source may be used to subject at least one strand material to heating at one or more locations along this strand material. Alternatively, the first light beam may be provided from a first light source and the second light beam may be provided from a second light source. In other instances, the at least a first light beam and a second light beam may be provided from at least one light source. In some instances, the at least one of the two or more light beams may contact the at least one strand material prior to deposition. The one or more other light beams may contact the at least one strand material prior to, during, or even after deposition. Such strand material may also be directed to one or more compaction units 106, while heated with at least the first light beam and the second light beam along one or more points of this strand material. The light beam may be a laser beam. The light source may be a laser head that is mounted on a robot or similar mechanism that swivels around the vertical axis enabling deposition in any direction in the plane of deposition. At least one strand material may be fed into a nozzle at an angle such that it is fed under a roller at a nip point 109 as the roller presses this strand material exiting from the nozzle. The nip point can be the point where such strand material meets the base and is pressed by one or more rollers resulting in a compressed cross section 110.

The cross section 107 of the nozzle 104 illustrates that the one or more laser beams may heat at least one strand material along one or more points of such strand material. The at least one freely suspended roller can be supported by one or more idler rollers 105. The compaction units may be designed to control the bend radii of such strand material. At least a portion of the three-dimensional object may be generated from such strand material continuously upon subjecting such strand material to heating along the one or more locations. The system 100 may further comprise a controller operatively coupled to at least one light source. The controller may be programmed to (i) direct at least one strand material from the source of at least one strand material towards the base, (ii) use at least the first light beam and the second light beam from at least one light source to subject at least one strand material to heating at one or more locations along at least one strand material, and (iii) generate at least a portion of the three-dimensional object from at least one strand material upon subjecting at least one strand material to heating along one or more locations.

Figure 1B:
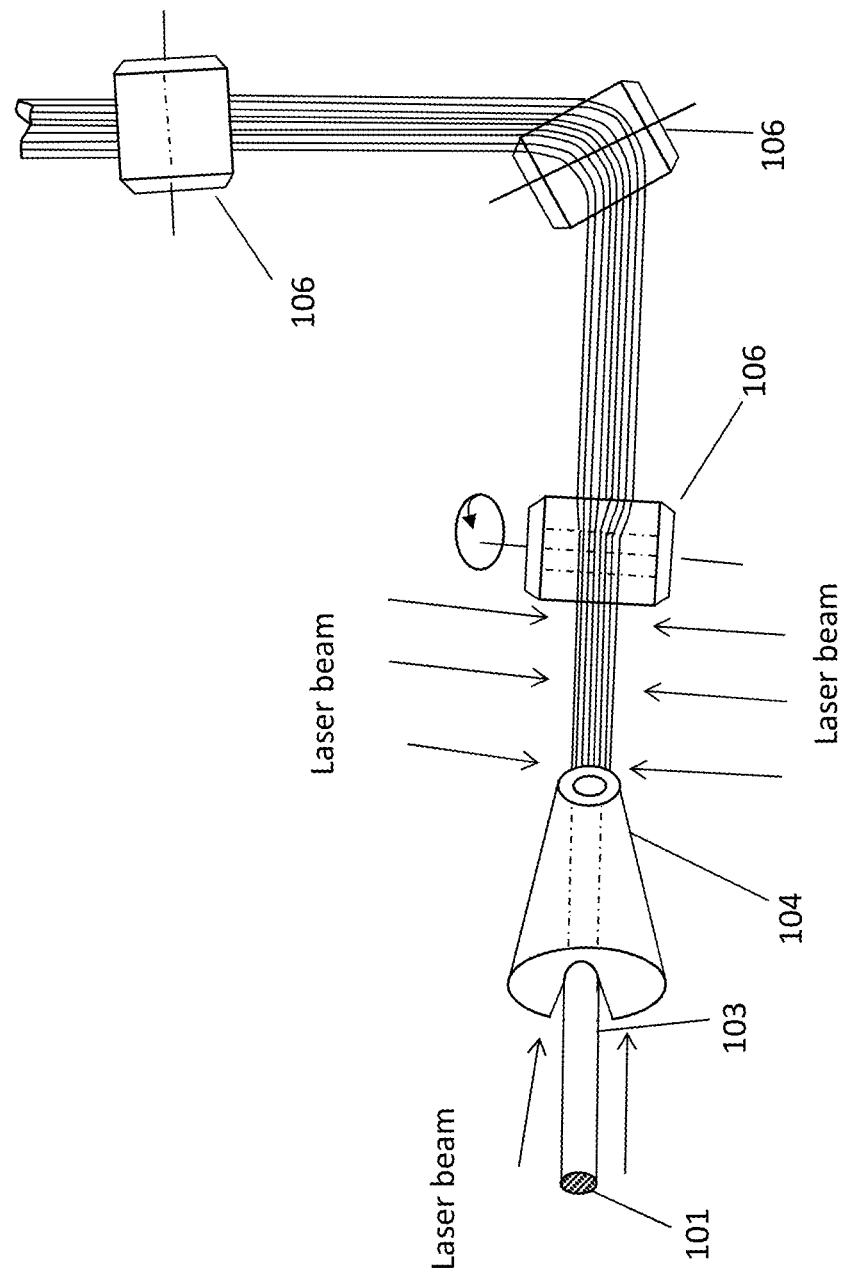
FIG. 1B illustrates an alternative view of the laser beam and compaction units mechanism for printing a three-dimensional object.

FIG. 1B shows an alternative view of the compaction unit mechanism. The laser beam may subject the at least one strand material 103 to heating prior to entering the nozzle 104, while in the nozzle, after exiting the nozzle, prior to contact with one or more compaction units 106, and/or after compaction by such compaction units. The laser beams may heat and increase the temperature of such strand material above its melting point to soften and melt such strand material. The compaction units may then supply pressure to the softened strand material to create adhesion between the strand material and the base and among the layers of the three-dimensional object during deposition. In order to increase the at least one strand material adhesion to the base 108, the base may be coated with a high temperature polymer. Additionally, the surface of the high temperature polymer coating may be roughened or treated. The base may also be a removable plate to allow for quick installation and release between the base and the build plate and easier dissociation between the three-dimensional object and the base upon cooling. Such flexibility can also reduce the possibility of damage to the high temperature polymer coating or the three-dimensional object during object removal since a blade or wedge is no longer needed to remove the object. In some cases, guiding legs/rails may be used to slide the removable plate into multiple grooves and multiple set screws and fasteners to secure the base onto a build platform. Spring/latch quick-release mechanism may be used to secure in place and remove the base. In other cases, the method may be vacuum suction of the base onto the build platform. In yet another case, the method may be magnets and/or electromagnets to secure the base onto the build platform.

The source of at least one strand material may be configured to supply at least one strand material for generating the three-dimensional object. The at least one strand material may be a composite material, such as a continuous fiber composite. Such strand material may be nano milled, short, long, continuous, or a combination thereof. The continuous fiber composite may be a continuous core reinforced filament. The continuous core reinforced filament can comprise a towpreg that is substantially void free and includes a polymer that coats or impregnates an internal continuous core. Depending upon the particular embodiment, the core may be a solid core or it may be a multi-strand core comprising multiple strands. The continuous fiber composite can be selected from the group consisting of glass, carbon, aramid, cotton, silicon carbide, polymer, wool, metal, and any combination thereof.

The strand material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally, optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the strand material may comprise metal particles infused into a binder matrix. The metal particles may be metal powder. The binder matrix may include resins or polymers. Additionally, such binder matrix can be used a delivery device for the metal particles. Once the strand material is deposited onto the base, one or more energy sources can heat and melt the binder matrix, leaving the metal particles to melt and fuse into larger metal particles. Such energy sources may be without limitation, a laser, a microwave source, an infrared energy source, a UV energy source, convective hot air, a chemical reaction, or an electron beam. The one or more energy sources may also provide localized heating to create a "melt pool" in the current layer or segment of the deposited build material prior to depositing the next segment or layer. The melt pool can increase diffusion and mixing of the build material between adjacent layers (e.g., across a direction orthogonal to the layers) as compared to other methods which deposit a subsequent layer of build material on top of a layer of build material that is below its melting temperature.

The increased diffusion and mixing resulting from the melt pool may increase the chemical chain linkage, bonding, and chemical chain interactions between the two layers. This can result in increasing the build-material adhesion in the Z direction, thereby enhancing mechanical, thermal, and electrical properties of the three-dimensional object. The melt pool can also reduce the void space and porosity in the build object. Among other benefits, this decrease in porosity may also contribute to the aforementioned improvement in mechanical, thermal, and electrical properties.

The at least one strand material may have a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. Such strand material can have a diameter of at most about 0.1 millimeters (mm), at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 2 mm, at most about 3 mm, at most about 4 mm, at most about 5 mm, at most about 10 mm, or at most about 20 mm.

In some embodiments, at least a first light beam and a second light beam from at least one light source may be used to subject at least one strand material to heating at one or more locations along at least one strand material. Alternatively, the first light beam may be provided from a first light source and the second light beam may be provided from a second light source. In other instances, the at least a first light beam and a second light beam may be provided from at least one light source. Such light source may be a laser. The laser may be selected from the group consisting of gas lasers, chemical lasers, dye lasers, metal-vapor lasers, solid-state lasers, semiconductor lasers, free electron laser, gas dynamic laser, nickel-like samarium laser, raman laser, nuclear pump laser, and any combination thereof. Gas lasers may comprise one or more of helium-neon laser, argon laser, krypton laser, xenon ion laser, nitrogen laser, carbon dioxide laser, carbon monoxide laser, and excimer laser. Chemical lasers may be selected from the group consisting of hydrogen fluoride laser, deuterium fluoride laser, chemical oxygen-iodine laser, all gas-phase iodine laser, and any combination thereof. Metal-vapor lasers can comprise one or more of helium-cadmium, helium mercury, helium selenium, helium silver, strontium vapor laser, neon-copper, copper vapor laser, gold vapor laser, and manganese vapor laser. Solid-state lasers may be selected from the group consisting of ruby laser, neodymium-doped yttrium aluminium garnet laser, neodymium and chromium-doped yttrium aluminium garnet laser, erbium-doped yttrium aluminium garnet laser, neodymium-doped yttrium lithium fluoride laser, neodymium doped yttrium othovanadate laser, neodymium doped yttrium calcium oxoborate laser, neodymium glass laser, titanium sapphire laser, thulium yttrium aluminium garnet laser, ytterbium yttrium aluminium garnet laser, ytterbium:$_2$O$_3$ (glass or ceramics) laser, ytterbium doped glass laser (rod, plate/chip, and fiber), holmium yttrium aluminium garnet laser, chromium zinc selenium laser, cerium doped lithium strontium (or calcium) aluminum fluoride laser, Promethium 147 doped phosphate glass solid-state laser, chromium doped chrysoberyl (alexandrite) laser, erbium doped and erbium-ytterbium codoped glass lasers, trivalent uranium doped calcium fluoride solid-state laser, divalent samarium doped calcium fluoride laser, FARBE center laser, and any combination thereof. Semiconductor laser may comprise one or more of semiconductor laser diode laser (e.g., single diode or multi-diode laser), gallium nitride laser, indium gallium nitride laser, aluminium gallium indium phosphide laser, aluminium gallium arsenide laser, indium gallium arsenide phosphide laser, lead salt laser, vertical cavity surface emitting laser, quantum cascade laser, and hybrid silicon laser.

Figure 2A:
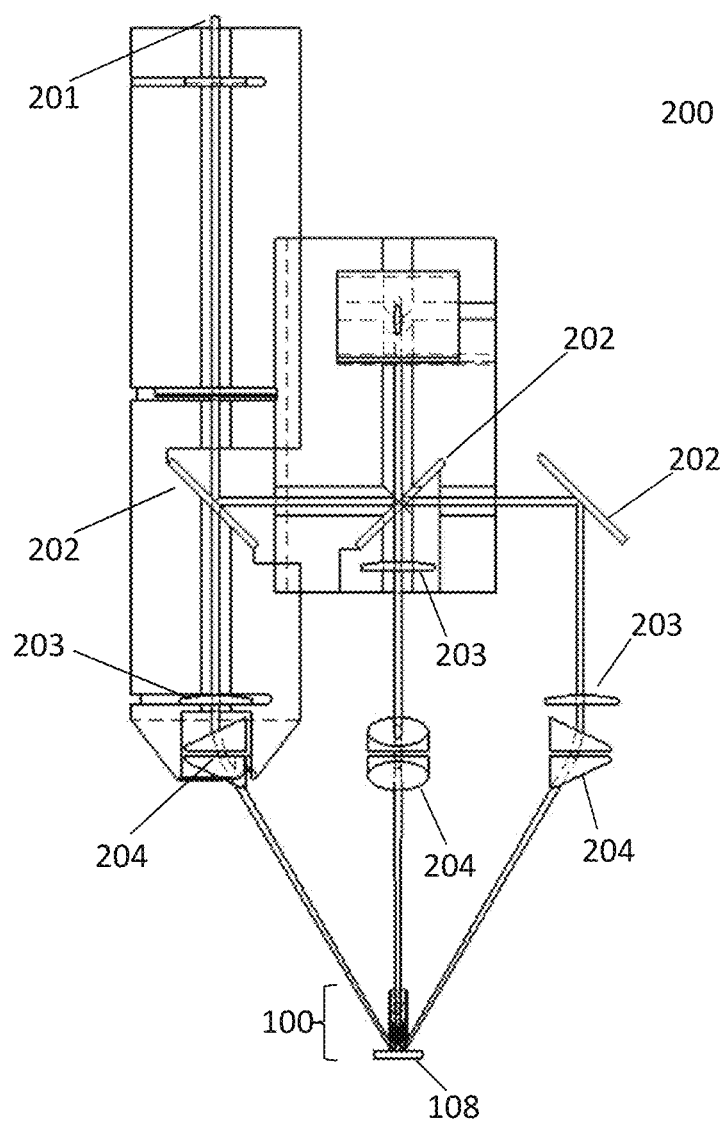
FIGS. 2A-2B shows various views of an optical system for splitting and directing light beams at various angles to the plane of the base.
Figure 2B:
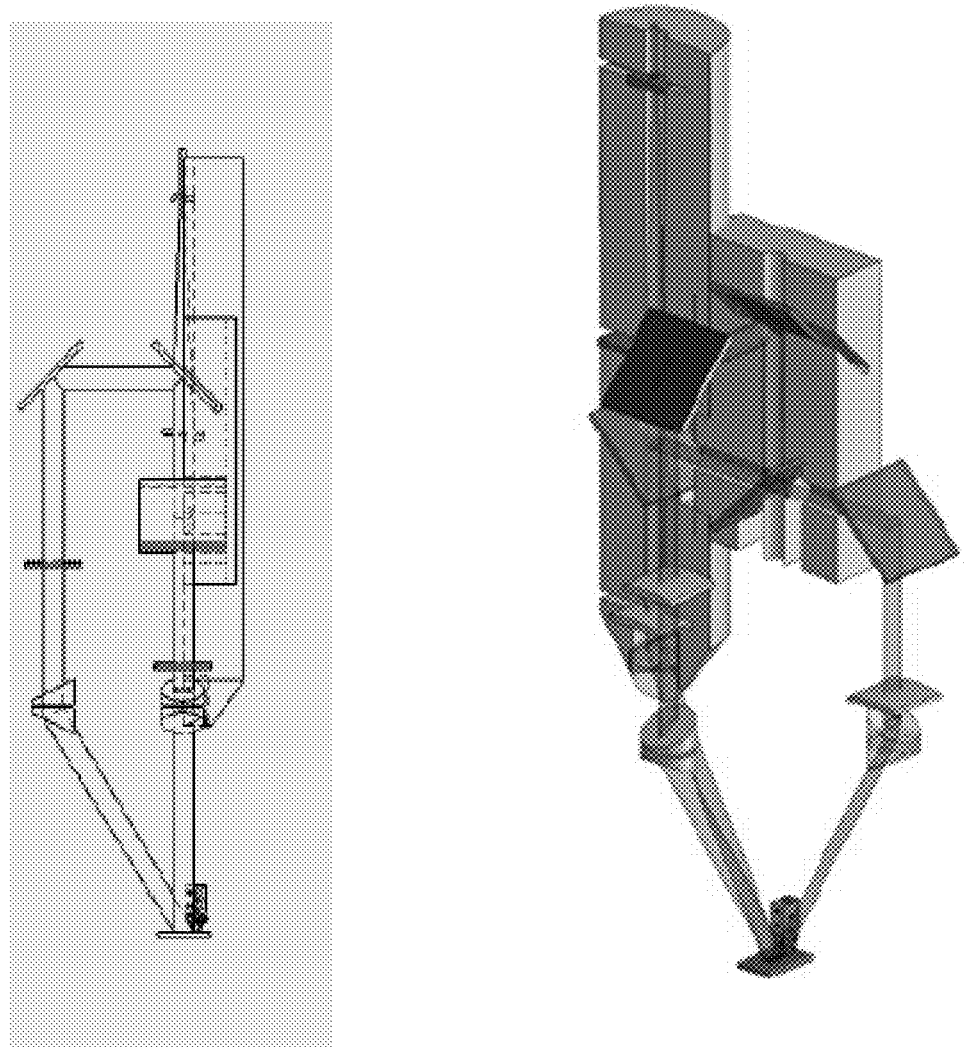

The at least one light source may be in optical communication with one or more beam splitters, which one or more beam splitters can split a light beam from at least one light source into one or more beamlets that yields at least the first light beam and the second light beam. FIG. 2A illustrates an example optical system 200 capable of receiving in an opening 201, splitting, and directing such light beams at various angles to the plane of the base 108 of system 100. System 200 can comprise one or more beam splitters 202, one or more focusing lenses 203, one or more optical wedges 204, and any combination thereof. The optical system 200 may allow the light beams to be aligned at any angle in the plane of deposition. The optical system may further comprise a beam expanding system and a spatial light modulator. At least the first light beam and the second light beam may be emitted by at least one light source and expanded by the beam expanding system into parallel light beams having a large diameter by the beam expanding system. Then, such parallel light beams may irradiate onto the one or more beam splitters. Additionally, a part of the expanded light beams may reach a spatial modulator for modulation after passing through the beam splitter and the modulated light beams can be reflected to the beam splitter. A part of the modulated light beam may be focused by the focusing system, angled by the optical wedges, and irradiated along the at least one strand material for three-dimensional printing. The beam expanding system may comprise a negative lens and a positive lens. Furthermore, the spatial light modulator can be a reflector type digital micro-mirror device or a phase type liquid crystal spatial light modulator. FIG. 2B shows two alternative views of the optical system 200.

One or more beam splitters may be selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. One or more optical wedges may be in optical communication with one or more beam splitters, which one or more optical wedges form at least the first light beam and the second light beam. Such optical wedges can form at least the first light beam and the second light beam in a uniform orientation. The one or more beamlets may pass through one or more focusing lenses prior to passing through at least one or more optical wedges. Such beamlets may have an elliptical polarization. The one or more beamlets may comprise a minor axis of at least about 0.5 mm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, or at least about 15 mm. The one or more beamlets may also comprise a major axis of at least about 5 mm, at least about 10 mm, at least about 15 mm, at least about 20 mm, at least about 25 mm, at least about 30 mm, at least about 35 mm, at least about 40 mm, at least about 45 mm, or at least about 50 mm. Such light beams can cover at least a portion of at least one strand material. The one or more focusing lenses may be used to adjust a ratio of the minor axis to the major axis of the one or more beamlets.

Optical wedges may change the path of the beam from vertical to any angle for uniform heating of the strand material, while the strand material is under compaction. The one or more optical wedges can also direct an optical path of at least the first light beam and the second light beam of a given location, direction, or angle normal to the base and/or along the base among one or more locations, directions, or angles. Such a direction of one or more optical wedges can allow for control of the heat from the light beam along the at least one strand material.

The one or more optical wedges can be used in combination with one or more of dispersive prism, reflective prism, beam-splitting prism, polarizing prism, or deflecting prisms. Dispersive prisms may be used to break up light into its constituent spectral colors because the refractive index depends on frequency. Examples of dispersive prisms include Triangular prism, Abbe prism, Pellin-Broca prism, Amici prism, Compound prism, or Grism prism. Reflective prisms can be used to reflect light, in order to flip, invert, rotate, deviate or displace the light beam. Examples of reflective prisms include Porro prism, Porro-Abbe prism, Amici roof prism, Pentaprism, Roof Pentaprism, Abbe-Koenig prism, Schmidt-Pechan prism, Bauernfeind prism, Dove prism, or Retroreflector prism. Some reflective prisms may be used for splitting a beam into two or more beams. Beam-splitting prisms may be a beam splitter cube or a dichronic prism. Polarizing prisms can split a beam of light into components of varying polarization. Examples of polarizing prisms may be Nicol prism, Wollaston prism, Nomarski prism, Rochon prism, Senarmont prism, Glan-Foucault prism, Glan-Taylor prism, or Glan-Thompson prism. Deflecting prisms may be one or more of a Risley prism pair, Rhomboid prisms, or Deck prisms. Wedge prisms may be used to deflect a beam of light by a fixed angle. A pair of such prisms can be used for beam steering; by rotating the prisms the beam can be deflected into any desired angle. The deflecting prism may be a Risley prism pair. Two wedge prisms can also be used as an anamorphic pair to change the shape of a beam. For example, this may be used to generate a round beam from the elliptical output of a laser diode.

One or more optical wedges can have a refractive index of at least about 0.5, at least about 1, at least about 1.1, at least about 1.2, at least about 1.3, at least about 1.4, at least about 1.5, at least about 1.6, at least about 1.7, at least about 1.8, at least about 1.9, at least about 2.5, at least about 3, at least about 4, or at least about 5. One or more optical wedges can have a refractive index of at most about 5, at most about 4, at most about 3, at most about 2.5, at most about 1.9, at most about 1.8, at most about 1.7, at most about 1.6, at most about 1.5, at most about 1.4, at most about 1.3, at most about 1.2, at most about 1.1, or at most about 1. In some instances, the one or more optical wedges can have a refractive index that is in a range of about 0.5 to about 3, about 1 to about 2.5, about 1.1 to about 2.5, about 1.3 to about 1.6, about 1.2 to about 1.7, or about 1.4 to about 1.8. Such optical wedges can have a diameter of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, at most about 2 in, at most about 3 in, at most about 4 in, or at most about 5 in.

In some embodiments, at least the first light beam and the second light beam may be incident on at least one strand material and on the base and can be directed along a dispensing route of at least one strand material. Such light beams may be directed along a given angle among one or more angles relative to the dispensing route of at least one strand material. The one or more optical wedges can comprise a first optical wedge and a second optical wedge. The first optical wedge may be the top wedge and the second optical wedge may be the bottom wedge. Through choosing the wedge angle, the lights beams can be made incident on the filament at an angle to the plane of the base. By rotating the bottom optical wedge, the incident angle can be varied. By rotating both the optical wedges, the angle of the line beam in the plane of deposition can be varied. For example, the first optical wedge may rotate relative to the second optical wedge to change the direction of at least the first light beam and the second light beam. The first optical wedge and the second optical wedge can be angled in the same direction to produce a greater angle of at least the first light beam and the second light beam. When altering an angle of incidence of the first optical wedge and the second optical wedge, or when altering a direction of the major axis of at least the first light beam and the second light beam relative to the base or at least one strand material, the fluence of at least the first light beam and the second light beam may be altered. As a result, such light beams may heat at least one strand material without melting such strand material. In some instances, at least the first light beam and the second light beam can heat and melt at least one strand material at a given location among one or more locations. In other instances, such light beam may cut at least one strand material at a given location among the one or more locations.

At least one strand material may be directed to one or more compaction units while heating at least one strand material with at least the first light beam and the second light beam along one or more points of the at least one strand material. Such strand material may be compacted by one or more compaction units in a compaction module to form at least one compacted strand material while heating at least one compacted strand material with at least a first light beam and a second light beam along one or more points of at least one compacted strand material. The one or more compaction units may be a roller, lip, edges, or a shaper of any geometry. In some instances, the compaction module may comprise a rigid body, one or more idler rollers, at least one freely suspended roller, and a cooling unit. The freely suspended roller may be a compaction roller. The rigid body and one or more idler rollers may secure the freely suspended roller. Such compaction rollers may have a diameter of at most about 1 mm, at most about 2 mm, at most about 3 mm, at most about 4 mm, at most about 5 mm, at most about 6 mm, at most about 7 mm, at most about 8 mm, at most about 9 mm, at most about 10 mm, or at most about 15 mm. The cooling unit may be used to cool the compaction roller so the at least one strand material does not stick to the roller and adheres to the previously deposited layer of the three-dimensional object. Additionally, the cooling may permit the one or more compaction units to be removed from a deposited layer. In other instances, the compaction unit may be heated by an internal or external energy source.

Figure 3:
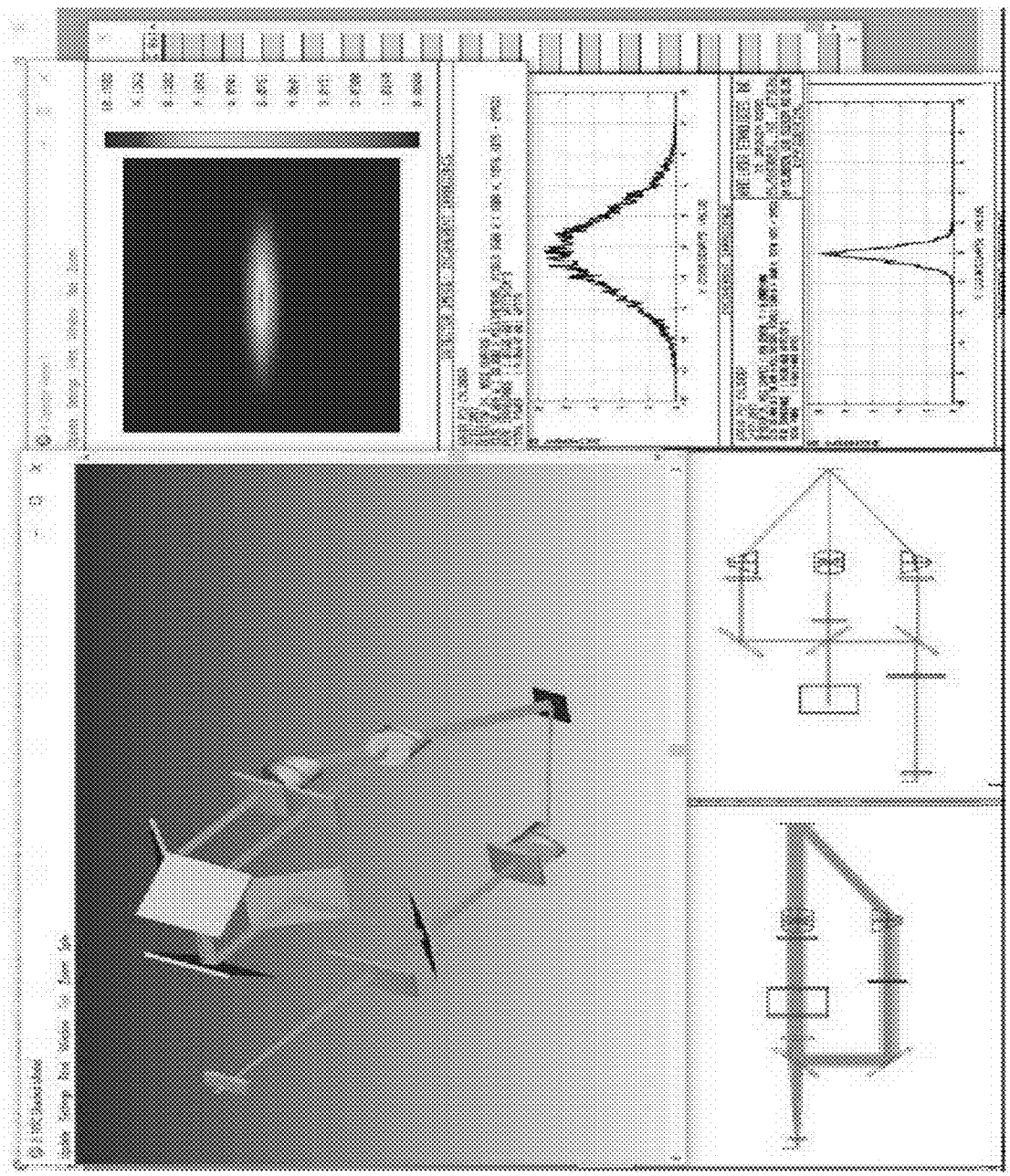
FIG. 3 illustrates a real time simulation feedback program for propagation of the light beams.

During printing of the three-dimensional object, certain parameters may be critical to printing high quality parts. One or more sensors can be used to measure one or more temperature(s) along at least one strand material during deposition. Such sensors can control intensities, positions, and angles of at least the first light beam and the second light beam. The one or more sensors may be an optical pyrometer. Optical pyrometers may be aimed at the nip points and one or more points before and after the compaction roller to detect the temperature of the at least one stand materials as they are deposited. Additionally, the system may comprise a real time simulation program, a sample as shown in FIG. 3, to provide feedback control of a given location, direction, or angle of at least the first light beam and the second light beam normal to the base and/or along the base among one or more locations, directions, or angles. The sample real time simulation of the optical beam path illustrates that choosing the appropriate wedge angle and light beam orientation will result in the elliptical beam profile in FIG. 3. The real time simulation program may be a feedback control system. The feedback control system may be a Zemax simulation of the beam propagation.

Other parameters critical to printing high quality parts can include substrate temperature, melt zone temperature, as-built geometry, surface roughness and texture and density. Other critical visible or non-visible metrics include characterization of chemistry, bonding or adhesion strength. Measuring one or more structural or internal properties of the part can comprise one or more methods selected from the group consisting of scattered and reflected or absorbed radiation, x-ray imaging, sound waves, scatterometry techniques, ultrasonic techniques, X-ray Photoelectron Spectroscopy (XPS), Four Transform Infrared Spectroscopy (FTIR), Raman Spectroscopy, Laser-Microprobe Mass Spectrometry (LMMS), and any combination thereof. Specific metrology beneficial to the end goals of characterizing the critical process parameters can be used. This in-situ metrology coupled with fast processing of data can enable open or closed loop control of the manufacturing process. Sensors appropriate to the key parameters of interest can be selected and utilized during the part printing process. The sensors may also comprise a camera for detecting light in the infrared or visible portion of the electromagnetic spectrum. Sensors such as IR cameras may be used to measure temperature fields. An image processing algorithm may be used to evaluate data generated by one or more sensors, to extract one or more structural or internal properties of the part. Visual (e.g. high magnification) microscopy from digital camera(s) can be used with proper software processing to detect voids, defects, and surface roughness. In order to utilize this technique, potentially large quantities of data may need to be interrogated using image processing algorithms in order to extract features of interest. Scatterometry techniques may be adapted to provide roughness or other data.

Ultrasonic techniques can be used to measure solid density and fiber and particle density which in turn may be useful in characterizing bond strength and fiber dispersion. The characterization can affect material strength. Ultrasonic techniques can also be used to measure thickness of features. Chemical bonding characterization, which may be useful for understanding fiber and/or matrix adhesion and layer-to-layer bonding, can be performed by multiple techniques such as XPS (X-ray Photoelectron Spectroscopy), FTIR (Four Transform Infrared Spectroscopy) and Raman Spectroscopy and Laser-Microprobe Mass Spectrometry (LMMS). One or more of these techniques may be utilized as part of the in-situ metrology for 3D printing. Ex-situ techniques may also be utilized in order to help provide appropriate calibration data for the in-situ techniques.

Sensors may be positioned on the robot end-effector of the three-dimensional printer in order to provide a sensor moving along with the deposited material. A robot end-effector may be a device positioned at the end of a robotic arm. The robot end-effector may be programmed to interact with its surrounding environment. Sensors may be also located at other various positions. The positions can be on-board the robot, on the effector, or deployed in the environment. Sensors may be in communication with the system. The system can further comprise one or more processors, a communication unit, memory, power supply, and storage. The communications unit can comprise an input and an output. The communication unit can be wired or wireless. The sensor measurements may or may not be stored in a database, and may or may not be used in future simulation and optimization operations. In-situ measurements may also be made using alternative methods with sensors in a cell but not directly attached to the robot end-effector.

Computer Control Systems

Figure 4:
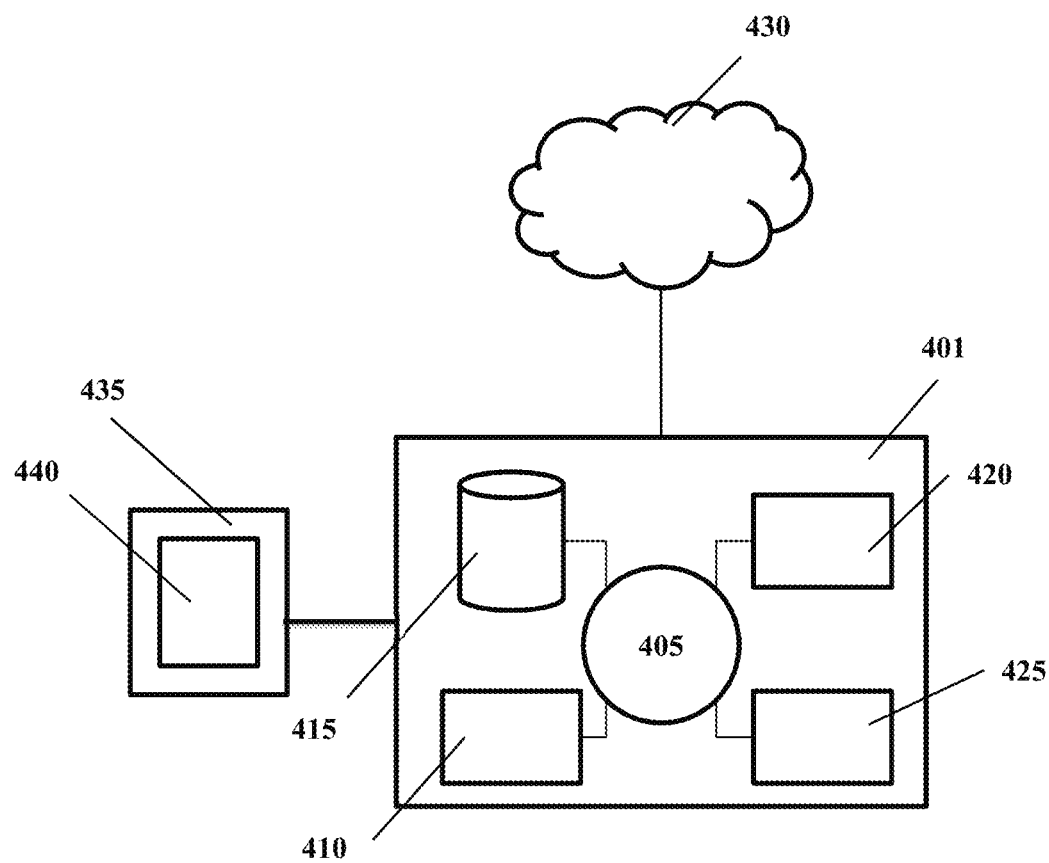
FIG. 4 illustrates a computer control system that is programmed or otherwise configured to implement methods provided herein.

The present disclosure provides computer control systems that are programmed to implement methods of the disclosure. FIG. 4 shows a computer system 401 that is programmed or otherwise configured to implement 3D printing methods and systems of the present disclosure. The computer system 401 can regulate various aspects of methods the present disclosure, such as, for example, partitioning a computer model of a part and generating a mesh array from the computer model.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., customer or operator of a 3D printing system). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, a print head tool path to a user. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, partition a computer model of a part and generate a mesh array from the computer model.

The computer system 401 can include a 3D printing system. The 3D printing system may include one or more 3D printers. A 3D printer may be, for example, a fused filament fabrication (FFF) printer. Alternatively or in addition to, the computer system 401 may be in remote communication with the 3D printing system, such as through the network 430.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a three-dimensional object, the method comprising:
    directing a strand of material from a source towards a base;
    splitting a light beam from one light source into:
        (i) a first light beamlet, and
        (ii) a second light beamlet;
    heating the strand of material with
        (i) the first light beamlet, and
        (ii) the second light beamlet; and
    generating at least a portion of the three-dimensional object from the strand of material after heating the strand of material with the first light beamlet and with the second light beamlet;
    wherein the first light beamlet has an elliptical polarization; and
    wherein the second light beamlet has an elliptical polarization.

2. The method of claim 1, wherein the first light beamlet comprises a minor axis of less than 15 millimeters and a major axis of less than 50 millimeters.

3. The method of claim 1, wherein the first beamlet passes through a first optical wedge and a second optical wedge.

4. The method of claim 3, where the first optical wedge rotates relative to the second optical wedge.

5. The method of claim 1, further comprising:
    directing the strand of material to a compaction unit while heating the strand of material with the first light beamlet and the second light beamlet.

6. The method of claim 1 further comprising:
    measuring a temperature of the strand of material.

7. The method of claim 1, wherein the first light beamlet and the second light beamlet heat the strand of material without melting the strand of material.

\* \* \* \* \*